United States Patent [19]
Held

[11] 4,197,550
[45] Apr. 8, 1980

[54] APPARATUS FOR AN AUTOMATIC MARKING OF DRAWINGS

[76] Inventor: Kurt Held, Alte Str. 1, 7218 Trossingen 2, Fed. Rep. of Germany

[21] Appl. No.: 911,355

[22] Filed: Jun. 1, 1978

[30] Foreign Application Priority Data

Jun. 2, 1977 [DE] Fed. Rep. of Germany ....... 2724855

[51] Int. Cl.[2] ....................... G01D 9/00; G01D 15/16; B43L 13/00

[52] U.S. Cl. ................................ 346/29; 346/139 R; 33/18 R

[58] Field of Search ..................... 346/8 R, 29, 139 R; 33/18 R

[56] References Cited

U.S. PATENT DOCUMENTS 2,751,273 6/1956 Rankin ................................ 346/8 R
2,976,103 3/1961 Flanders et al. ...................... 346/29
3,376,578 4/1968 Sawyer ................................ 346/29

*Primary Examiner*—George H. Miller, Jr.
*Attorney, Agent, or Firm*—Lackenbach, Lilling & Siegel

[57] ABSTRACT

The apparatus is used for the automatic marking of drawings with alphanumeric and other drawing symbols. A carriage is designed to travel over the drawing without damaging the drawings. Means are provided to rigidly hold the carriage in place over the point on the drawing to be marked. Stylusses of varying sizes are interchangeably fitted on the carriage. Flexible cables connect the carriage to a control unit. Stored programs of the control unit are used to direct the marking operation. The unused stylusses are stored in appropriate receptacles in the control unit. A keyboard can be used to select the desired marking program.

17 Claims, 4 Drawing Figures

FIG. 3
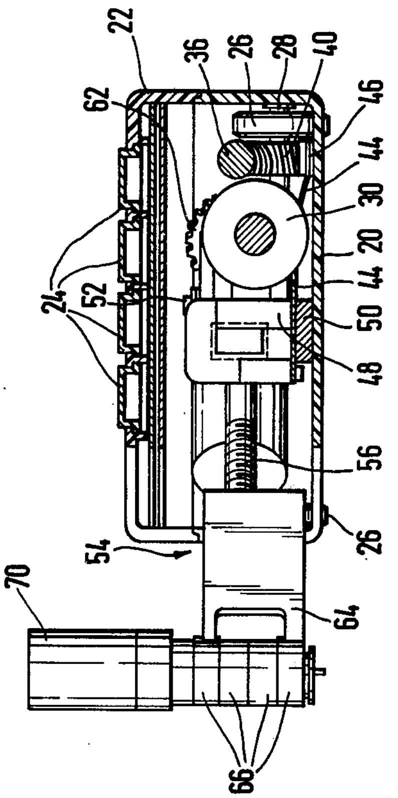
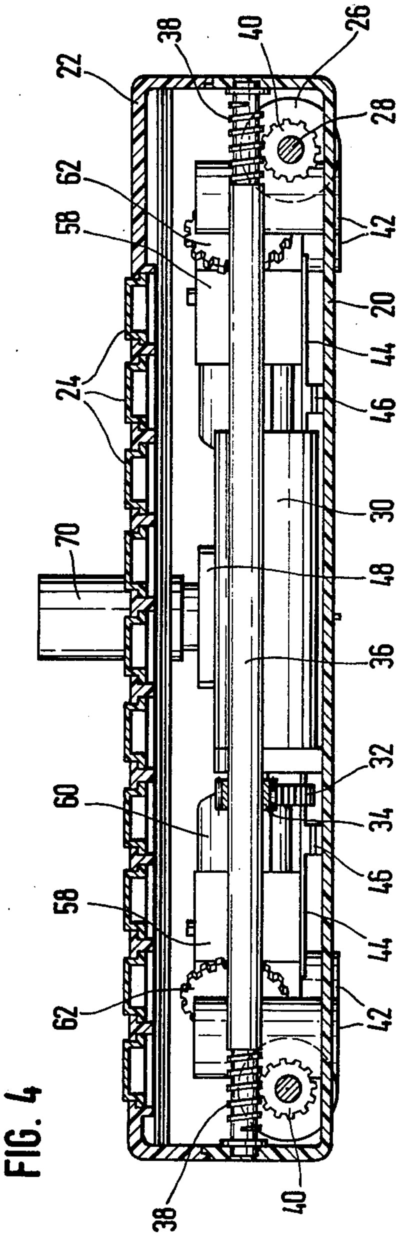
FIG. 4

APPARATUS FOR AN AUTOMATIC MARKING OF DRAWINGS

FIELD OF THE INVENTION

The invention relates to apparatus for the automatic marking of drawings with alphnumeric symbols, other drawing symbols and the like, in which a carriage travelling over the drawing carries a controllable marking unit and in which a control unit is connected to the carriage by flexible cables.

The marking of drawings is conventionally carried out with the aid of stencils. This is a very tedious, time-consuming method. Moreover, a very large stock of stencils has to be kept in order to ensure availability of alphnumeric symbols of all occurring sizes and kinds as well as of the standard drawing symbols used, for example, in blueprints, construction drawings, electric and electronic circuit diagrams, and so on.

DESCRIPTION OF THE PRIOR ART

In apparatus of the type initially referred to, which is disclosed in British Patent Specification No. 1 366 253, the marking or lettering is effected by a matrix printing head arranged in a carriage travelling over the drawing.

The carriage is moved manually over the drawing to the desired position, the printing head for the required symbol to be printed being triggered by a control unit separate from the carriage, which is connected to the carriage by flexible cables in order to permit an unobstructed movement of the carriage. Furthermore, the extent of displacement of the carriage in that apparatus is measured by photoelectric means, each symbol being printed after the carriage has covered a predetermined distance. In this way it is ensured that the symbols are printed at regular intervals independently of the speed of displacement of the carriage.

Owing to the use of a matrix printing head, the known apparatus is essentially limited to the printing of alpharnumeric symbols. It is generally impossible for drawings to be marked with standard drawing symbols, since these symbols cannot generally be represented in a conventional matrix screen.

British Patent Specification No. 1 317 207 discloses a printer in which the marking device concists of a marker or stylus capable of electronically controlled application of any selected symbol in the X-Y plane by means of two bimorph elements which extend at right angles to each other.

However, this marking device constitutes an integral part of a printer and can thus be used only for the marking of standard sheets fed into the printer and is thus unsuitable for marking drawings of various formats.

German Offenlegungsschrift No. 2 451 436 discloses apparatus for marking drawings, in which the marking unit travels on guide rails on he drawing in the X–Y direction, the apparatus being provided with types operated by depression of keys.

The application of this apparatus is limited to the types provided in the marking unit and thus to a limited number of alphanumeric symbols. Moreover, the apparatus renders it, necessary for the drawing to be clamped to a supporting plate involving additional expenditure of time and limitation of the operational suitability.

SUMMARY OF THE INVENTION

It is an object of the invention to provide apparatus for an automatic marking of drawings, which permits any desired alphanumeric symbol or other drawing symbol to be applied quickly and conveniently to drawings of any format at any optional position.

In accordance with the invention, this problem is solved in apparatus of the kind initially described in that the movement of the stylus or marker provided in the marking unit in the drawing plane is controlled by programs stored in a control unit and a program-selector is provided.

The use of a stylus or marker, the movement of which in the drawing plane is controlled, permits the application of any desired mark or symbol. It is merely necessary for the appropriate programs of symbols for controlling the marker to be stored in the control unit. The program required at the time can then be selected by a selector, for example by depression of the appropriate key.

The programs for the marks and symbols appropriate to a specific field of use of the apparatus may also be stored particularly advantageously in semiconductor stores to permit a convenient exchange or amplification of the programs stored. In this way, a virtually unlimited number of marks and symbols can be applied by the apparatus and the apparatus can conveniently be adjusted to each particular use, or it may be changed over to or re-equipped for another application.

The carriage to be applied to the drawing travels conveniently on wheels, its automatic movements being program-controlled. In this way, a signal for driving the wheels of the carriage may be added, for example to programs used for controlling the marker for the application of alphanumeric symbols, thus causing the carriage automatically to continue to move to the extent of one spacing between two symbols after the application of a symbol, so as to assume the position required for application of the next symbol.

In this case, the apparatus can be used as simply and as conveniently as, for example, a typewriter. The lettering or marking of a drawing then requires merely application of the carriage of the drawing at the desired position and continuous typing of the alphanumeric or other symbols on the keyboard of the program selector.

Specific indexing steps of the carriage may also be stored permanently in the control unit to serve as programs for driving the wheels of the carriage thus avoiding the provision of exchangeable semiconductor stores for storing these programs.

The underside of the carriage is conveniently provided with holding magnets by which the carriage is held firmly under pressure against the drawing, which rests on a ferromagnetic support. The carriage is thus held firmly in position on the drawing during the application of marks or symbols and an exact indexing of the carriage being thus ensured. The magnets must, however, not contact the drawing in order to avoid obstruction of the movement of the carriage. On the other hand, their distance from the drawing should be as small as possible so that weakening of the holding strength of the magnets by a large air gap may be avoided. The magnets consist advantageously of electromagnets which can be disconnected from the power supply when the carriage is to be lifted off the drawing to be re-applied at a different positon thereon.

In one particular construction, the stylus or marker may be held by two arms which are freely rotatable in the drawing plane and which are arranged at an angle to each other, their free ends being hinged together and their lengths being adapted for controlled adjustment. The stylus or marker is inserted into a receptacle provided at the ends of the arms, the ends being hinged together. The stylus can be guided along any curve in the drawing plane by separately controlled adjustment of the lengths of the arms.

The arms are tilted or swung upwardly from their positions, in which they extend parallel to the drawing, to enable the stylus to be lifted off and lowered on to the drawing. This is achieved simply by arranging the arms on a plate mounted in the carriage and rotatable about a horizontal axis. The plate together with the arms and the stylus can thus also be swung upwardly and downwardly away from and towards the drawing plane by the control unit in a program controlled manner.

The application of the stylus to the drawing and its removal from the drawing are controlled by a control signal provided at the beginning and at the end of each program of symbols.

In this construction, it is also possible for the stylus to be shaken in its longitudinal direction by a vibrating up-and-down movement of the plate and of the arms, this being advantageously carried out prior to the initial marking where an Indian-ink marker is used. The vibration may also be generated by a control signal stored at the beginning of the respective programme of symbols.

Operation of the apparatus may be further simplified and facilitated by inserting various stylusses of different line-thicknesses, selectively used in the apparatus, into receptacles provided in the control unit. These receptacles are fitted with internal contacts which are operated by the inserted stylus. When a stylus of a determined line thickness is withdrawn to be inserted into the arms provided in the carriage, the associated contact in its receptacle is released with the result that a determined group of the programs of symbols stored in the control unit is preselected. A plurality of groups of similar programs of symbols, differing from each other merely with regard to size according to the line thickness used, can thus be stored in the control unit. Insertion of a stylus into the apparatus thus results automatically in selection of the size of script corresponding to the line thickness of that particular stylus.

It is also possible for a plurality of carriages to be connected to a single control unit. The programs stored in the common control unit may be called for each carriage separately by a keyboard provided on each carriage. This construction is particularly economical in larger designing and drawing offices, since a single control unit with the necessary electronic circuits and program stores is sufficient to supply a plurality of drawing desks.

BRIEF DESCRIPTION OF THE DRAWINGS

One embodiment of the invention is described below by way of example with reference to the accompanying drawings, in which

FIG. 3 is a cross-sectional view taken along the line III—III of FIG. 2; and

FIG. 4 is a side elevational view of the carriage on the side remote from the stylus or marker with the side wall removed.

DETAILED DESCRIPTION OF THE INVENTION

Figure 1:
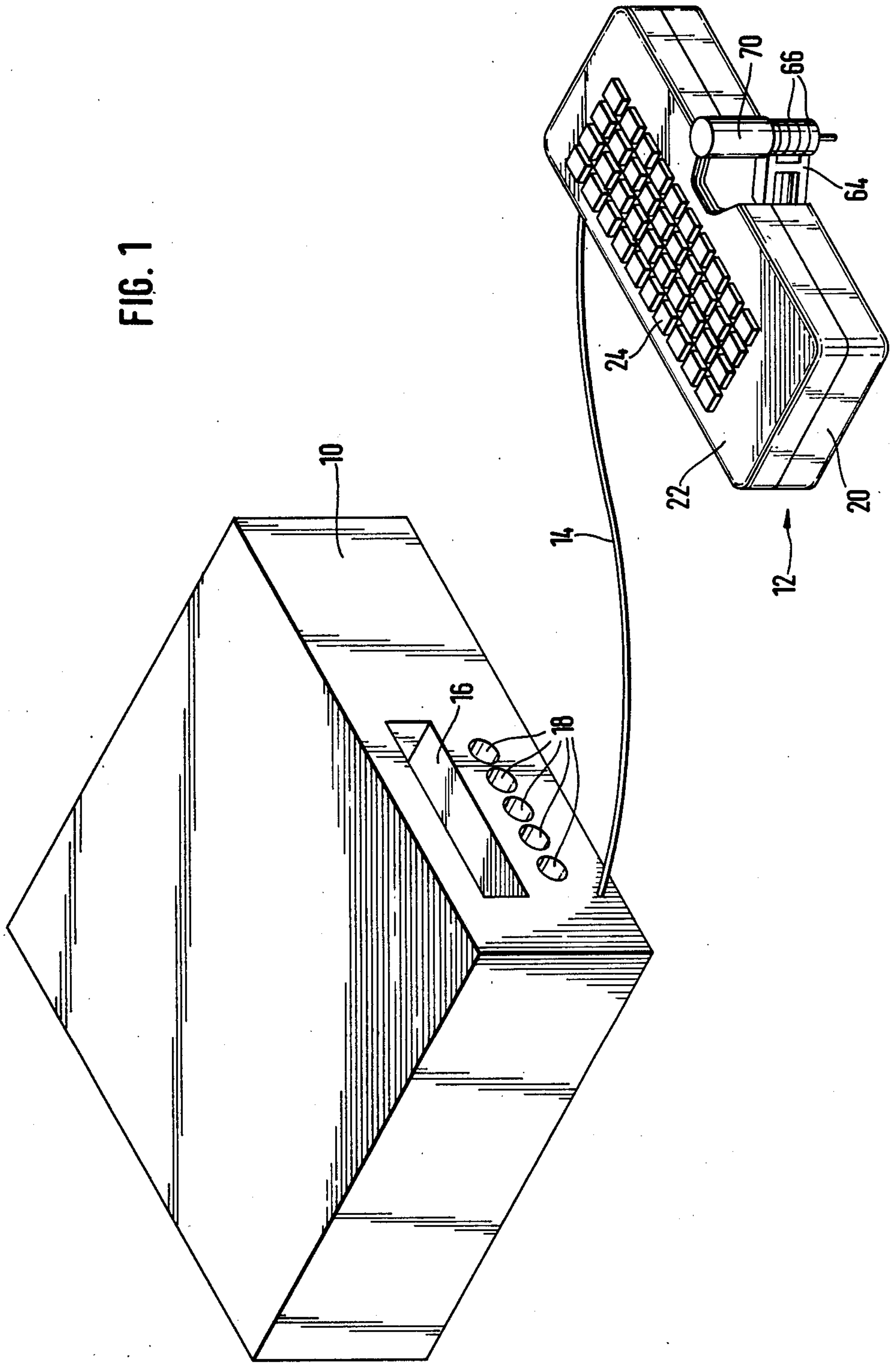
FIG. 1 is a perspective, general view of an apparatus according to the invention.

The apparatus shown in the drawings comprises a control unit 10 and a carriage 12 which are interconnected by a flexible cable 14 containing electric connectors between the control unit 10 and the carriage 12. For the sake of simplicity, a single carriage is shown in FIG. 1, although the control unit may be a central control unit with a plurality of carriages 12 forming peripheral units.

The control unit 10 contains a receptacle 16 into which the carriage 12 may be inserted when not in use. The control unit 10 is provided with additional receptacles 18 for the insertion of additional stylusses or markers, for example, of various line-thicknesses.

The carriage 12 comprises a lower housing part 20, which carries the marking and driving arrangements hereinafter described, and an upper housing part 22, which carries a keyboard 24 for selection of the programs stored in the control unit 10.

Figure 2:
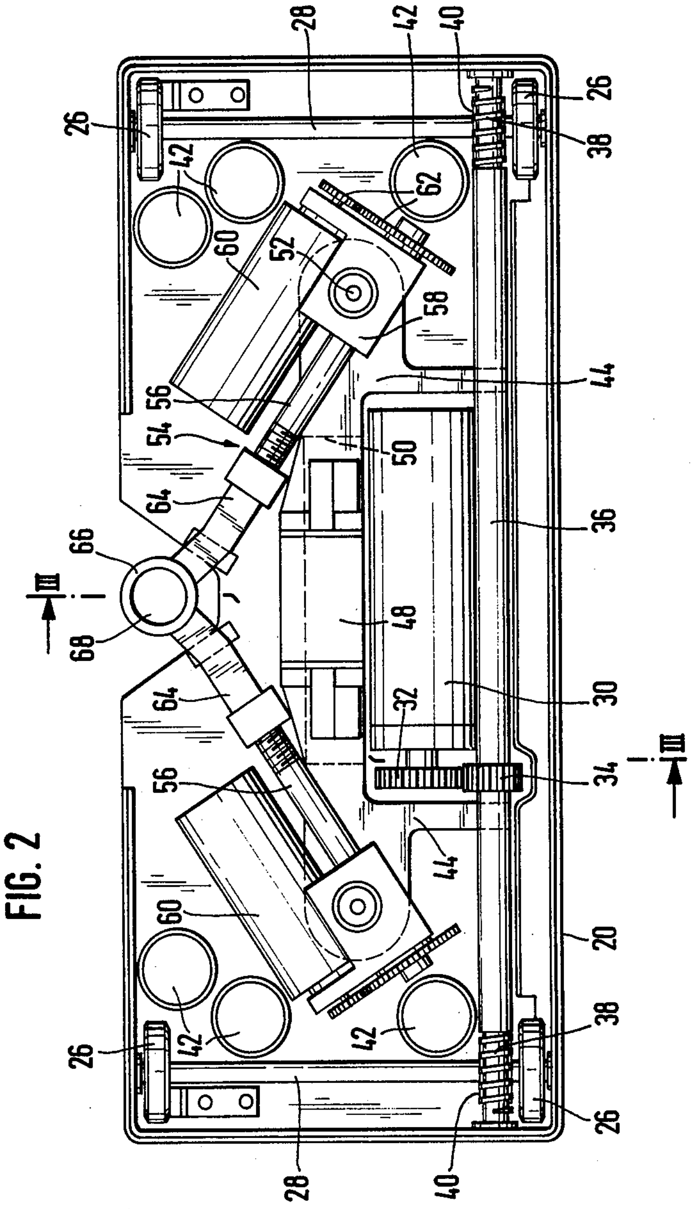
FIG. 2 is a top plan view of the carriage in the apparatus shown in FIG. 1 with the housing cover removed.

The construction of the carriage 12 is shown in detail in FIGS. 2, 3 and 4.

Wheels 26, provided in pairs on a common axle 28, are mounted at the four corners of the lower part 20 of the housing. The rims of the wheels 26 are covered with rubber tires in order to improve their adhesion to the drawing. As shown in FIGS. 3 and 4 the wheels project downwardly from the bottom of the housing part 20.

The wheels 26 are driven by an electric motor 30 mounted on the lower part 20 of the housing. A gear 32 meshing with a pinion 34 of a driving shaft 36 sits on the shaft of the electric motor 30. Worms 38 engaging worm gears 40 mounted on the wheel axles 28 are provided at both ends of the driving shaft 36 mounted in the lower part 20 of the housing.

The power supply to the electric motor 30 is controlled by the control unit 10 according to signals emitted by the programs stored in the control unit 10. This permits a controlled driving of the wheels 26 and a controlled travelling of the carriage 12 on the drawing. Non-slip driving of the carriage 12 on the drawing is ensured by the rubber tires covering the wheels 26 with the result that the carriage moves reliably and exactly the distance corresponding to a program.

The lower part 20 of the housing contains additional electromagnets 42 projecting from the bottom of the housing part 20 (FIG. 4). However, the magnets 42 project downwardly slightly less than the wheels 26 to leave a small air gap between the magnets 42 and the drawing on which the carriage rests. Obstruction of the movement of the carriage on the drawing by the magnets 42 is thus avoided.

When the drawing rests on a ferromagnetic plate, the magnets 42 serve as additional means for pressing the carriage against the drawing with the result that, in cooperation with the rubber tires covering the wheels 26, it is ensured that the wheels 26 are held perfectly securely in position on the drawing during the marking operation and the movement of the carriage proceeds absolutely free from of any slipping.

The magnets 42 are arranged as closely as possible to the four corners of the carriage in order to ensure that the carriage is pressed uniformly against the drawing. The magnets 42 are electromagnets which can be disconnected from the power supply thus permitting the carriage to be readily lifted off the drawing support as required.

A plate 44 is secured to the bottom of the lower housing part 20 at two points 46 close to the rear side wall of the housing. The plate 44 extends from the rear side wall to a position beyond the center of the bottom of the housing. The plate 44 is provided with clearances for accommodation of the electric motor 30.

An electromagnet 48 arranged parallel to the electric motor 30 is secured to the free front edge of the plate 44. A ferromagnetic block 50 is secured to the lower housing part 20 in the zone of the electromagnet 48. Upon excitation, the electromagnet is attracted by the ferromagnetic block 50 with the result that the plate 44 is held under pressure against the surface of the block 50. In the absence of power supply to the electromagnet 48, the plate 44 is lifted by its inherent elasticity off the block 50.

In the longitudinal direction of the carriage 12, a shaft 52 extends upwardly at right angles to the plate 44 on both sides of the plate 44. A freely rotatable arm 54 is mounted on each shaft 52.

The arms 54 consist of feed screws 56 which are rotatable in a spindle block 58 mounted on the shaft 52. The feed screws 56 are each driven by a motor 60 arranged on the spindleblock 58, through gears 62. Straps 64 forming spindle nuts are mounted on the free front ends of the feed screws 56. At the front ends, the straps 64 of the two arms 54 encompass each other with vertically superimposed, coaxially interengaging rings 66.

The free front ends of the arms 54 are thus hinged together. The rings 66 form a vertical, continuous, cylindrical receptacle 68. A stylus or marker 70, for example an Indian-ink marker, is inserted downwardly into the receptacle 68. The stylus or marker 70 is held in the receptacle in a resiliently engaging position.

Upon the supply of power by the control unit 10 to the electromagnet 48, as a result of a program control signal stored therein, the plate 44 is swung against its inherent elasticity from its upwardly swung position, in which it is raised above the block 50, downwardly to contact the block 50. The arms 54 pivoted to the plate 44 are swung downwardly together with the plate 44 and the point of the stylus 70 thus contacts the drawing.

The control unit 10 then supplies power to the electric motors 60 according to a program stored in a semiconductor store inserted in the control unit 10 and selected by depression of a key on a keyboard 24. As a result of the differential, changing of the power supply to the electric motors 60, the feed screws are driven at different speeds and in different directions of rotation variable with time with resulting adjustment of the lengths of the arms 54. The stylus 70 moves on the drawing as desired according to the coordinated adjustments of the lengths of the arms 54 stored in the program and thus applies to the drawing the marks or symbols selected by depression of the key.

Upon termination of the marking operation, the power supply to the electromagnet 48 is interrupted with the result that the plate 44 is swung upwardly off the block 50 and the stylus 70 is lifted off the drawing.

Excitation of the electromagnet with pulses of a higher frequency causes vibration of the plate 44 and thus shaking of the stylus 70 in the direction of its longitudinal axis. The duration of the pulses for excitation of the electromagnet is short in order to prevent the stylus from contacting the drawing completely. The shaking of the stylus 70 may be controlled by the stored programs before the stylus 70 touches down on the drawing, initial marking, when the stylus is an Indian-ink marker, thus being improved.

I claim:

1. Apparatus for automatic marking of a drawing with alphanumeric symbols or other symbols or like markings, comprising: a control unit; a carriage connected by a flexible cable to said control unit and movable over the drawing; a marking device movably supported by said carriage and comprising a stylus, wherein the marking device is supported on said carriage by the ends of two arms pivotally mounted on said carriage about axes perpendicular to the drawing plane, the axes of the arms intersecting and the ends of said arms being pivotally connected together at the intersection of the axes, the lengths of the arms being adjustable.

2. Apparatus according to claim 1, wherein the stylus is an Indian-ink marker.

3. Apparatus according to claim 1, wherein a program selector comprises a keyboard in which individual keys are associated with individual stored programs.

4. Apparatus according to claim 3, wherein the keyboard is provided on a top surface of the carriage.

5. Apparatus according to claim 1, wherein the carriage is provided with wheels for movement over the drawing, the wheels being driven by an electric motor.

6. Apparatus according to claim 5, wherein a plurality of magnets are provided on the underside of the carriage and said drawing is supported on a ferromagnetic support, said magnets and said ferromagnetic support being magnetically attracted to each, so as to hold the carriage firm with respect to the drawing.

7. Apparatus according to claim 6, wherein the rims of the wheels project slightly downwards from the magnets.

8. Apparatus according to claim 6, wherein the magnets are electromagnets.

9. Apparatus according to claim 6, wherein the wheels support the carriage so that lower ends of the magnets are spaced from the drawing.

10. Apparatus according to claim 1, wherein each arm is provided with a feed screw driven by an electric motor.

11. Appartus according to claim 10, wherein the marking device is mounted for movement on the carriage in a direction substantially perpendicular to the plane of the drawing.

12. Apparatus according to claim 11, wherein the ends of the arms are pivotally movable in a direction away from the plane of the drawing so that the arms cease to be parallel to the drawing plane and the marking device ceases to contact the drawing.

13. Apparatus according to claim 12, wherein the two arms are supported by a plate provided on the carriage, the plate being pivotally movable about an axis parallel to the plane of the drawing and supporting the two arms by means of shafts extending perpendicularly to the plate.

14. Apparatus according to claim 13, wherein pivotal movement of the plate is produced by an electromagnet.

15. Apparatus according to claim 14, wherein there is vibration of the plate.

16. Apparatus according to claim 14, wherein the carriage is provided with wheels for movement over the drawing, the wheels being driven by an electric motor.

17. Apparatus according to claim 16, wherein the pivotal movement of the plate and the driving of the wheels are coordinated by said control unit.

* * * * *